Feb. 10, 1925.  
F. BUSHMAN  
SPRING SUSPENSION FOR MOTOR VEHICLES  
Filed June 28, 1922

1,525,913

Inventor:
Frank Bushman,
by Burton & Burton
his Attys.

Patented Feb. 10, 1925.

1,525,913

UNITED STATES PATENT OFFICE.

FRANK BUSHMAN, OF CHICAGO, ILLINOIS.

SPRING SUSPENSION FOR MOTOR VEHICLES.

Application filed June 28, 1922. Serial No. 571,547.

*To all whom it may concern:*

Be it known that I, FRANK BUSHMAN, a citizen of the United States, residing in the city of Chicago, in the county of Cook and the State of Illinois, have invented certain new and useful Improvements in Spring Suspensions for Motor Vehicles, of which the following is a specification, reference being had to the accompanying drawings, forming a part thereof.

The purpose of this invention is to provide an improved spring suspension for road vehicles such as automobiles and motor trucks especially adapted to secure greater flexibility as well as greater steadiness than is possible with present constructions. It consists in the combination of certain features and elements hereinafter described and shown in the drawings as indicated by the claims.

Figure 1:
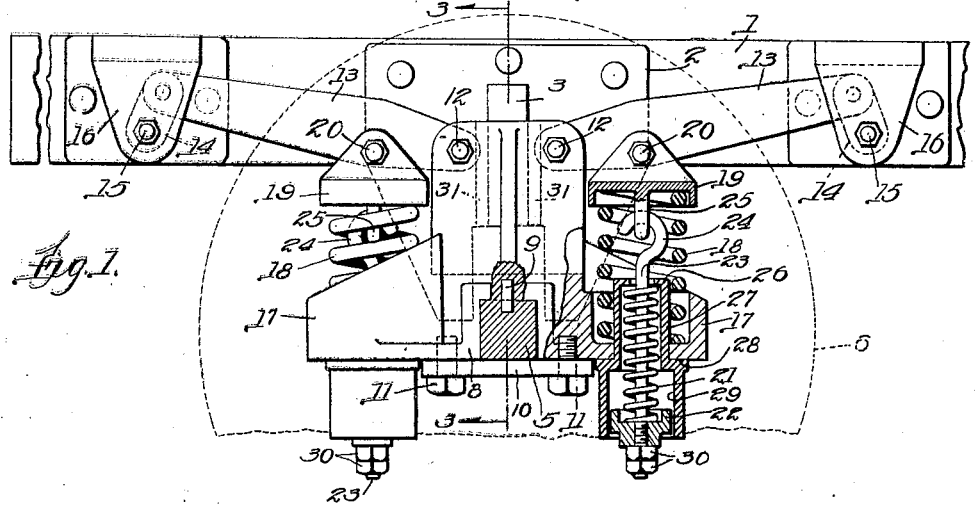
Figure 1 is a side elevation of a spring suspension device embodying this invention, with certain parts broken away and shown in section.

In the drawings, the longitudinal side member of the vehicle frame is shown at 1, and secured rigidly thereto is a guide plate 2 having a vertical rib, 3, and formed with a clearance notch or opening 4 in its lower portion to accommodate the up-and-down movement of the vehicle axle 5. The outline of the wheel at one side of the vehicle is shown at 6, and, for the purposes of this invention, it is assumed that the axle 5 is a solid axle and that the wheel is provided with a sprocket 7, to receive a drive chain; but it may be understood that the spring suspension constituting this invention is equally applicable to a structure in which a live axle is employed.

As near as practicable to the wheel 6, a saddle casting 8 is mounted on the axle, being positioned thereon by a dowel pin 9, and held securely by a clamp plate 10, fastened by bolts 11, extending into the saddle casting 8. The casting fits snugly over the axle 5, as shown in Figure 1, and extends upwardly therefrom to support fulcrum bolts, 12, 12, for levers, 13, 13, which extend in opposite directions from the saddle alongside the frame member 1, and support the frame on swinging links or shackles, 14, 14, each pivotally attached at 15 to a suitable hanger bracket 16, secured rigidly to the side frame member 1.

At each side of the axle 5, a saddle casting 8 is formed with a seat or pocket 17, supporting a heavy coiled spring 18 to whose upper end is fitted a cap or crosshead 19, pivoted at 20 to one of the levers 13. Thus the load of the frame 1 is actually transmitted to the axle 5 through the cushion springs 18, and while these springs are made fairly stiff and heavy, it will be noted that the shackles 14 are attached to the levers 13 at a distance from the fulcrums 12, which is over three times the distance of the pivots 20 therefrom, thus giving the load a considerable "leverage" upon the springs 18, and permitting ample vertical play of the frame 1 with a comparatively small variation in the length of the spring 18. As a result, the spring suspension may be made quite compact even when designed for very heavy loads. To check and absorb the rebound effect of the cushion springs 18 when they are compressed under load by irregularities in the road surface, I provide supplemental coil springs 21. Each of the springs 21 is stopped against a cupped head 22 on a rod 23, which has a hooked end 24 which engages an eye 25 formed on the under side of the cap or cross-head 19. The rod 23 extends slidably through the apertured head 26 of a guide tube 27, having an external shoulder 28, by which it is stopped against the lower side of the pocket 17 of the saddle casting 8. From the shoulder 28 downward, the guide tube is formed with a larger bore 29 to accommodate the up-and-down play of the head 22 on the rod 23. For adjusting the tension of the spring 21, the head 22 is screwed on to the rod 23 and the lock nuts 30 are provided for securing it at adjusted position. Thus the slight tension of the spring 21 opposes that of the spring 18, and may be nearly relieved when said spring 18 is suddenly compressed as the wheel strikes a bump in the road; but as the wheel leaves the bump and the spring 18 tends to expand beyond its normal limit in exhausting the energy stored upon its compression, such undue expansion is checked by the increased tension in the spring 21, and the rebound of the frame 1 is materially reduced, causing the vehicle to ride much more smoothly than if the springs 21 were omitted.

Figure 2:
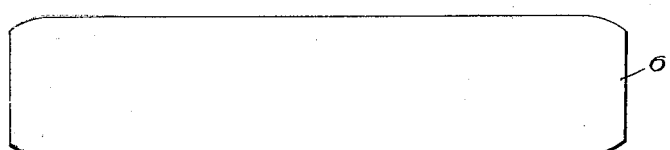
Figure 2 is a bottom plan view of the device shown in Figure 1, including in full lines the outline of the vehicle wheel.
Figure 3:
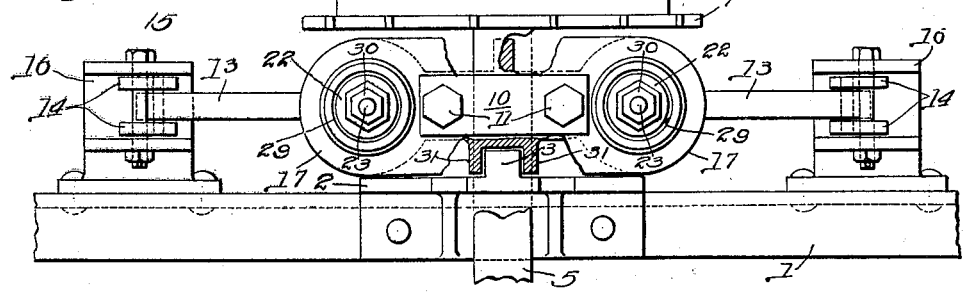
Figure 3 is a detail section taken as indicated at line 3—3 on Figure 1.
Figure 4:
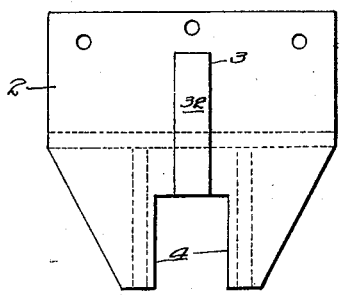
Figure 4 is a side elevation of a guide plate constituting a part of the invention.

The movement of the axle 5, permitted by this spring suspension, is a directly vertical movement controlled by the guide rib 3, which is engaged by flanges 31 on the inner face of the saddle casting 8 as seen clearly in Figure 2. But the axle 5 will not always remain parallel to its original position, since irregularities of the road may affect the wheels 6 independently or by unequal amounts. When this occurs the tilting of the axle 5 will not cramp the slide bearings at the guide ribs 3 because the outer surfaces of said ribs are slightly curved, as shown at 32 in Figure 3 to accommodate this angular movement of this axle 5. The arcuate movements of the outer ends of the levers 13 are of course accommodated by the provision of the swinging shackles 14 on which the frame is swung.

I claim:—

1. In combination with a vehicle frame and axle, a pair of levers, each fulcrumed on the axle in a substantially vertical plane and extending in opposite directions from their fulcrums, means for connecting said levers to the frame at points remote from their fulcrums, cushion springs engaging the levers intermediate such connections and said fulcrums, seating means for the spring supported on the axle, and a lighter spring reacting between each of said cushion springs and a support on the axle to oppose the rebound of the cushion spring.

2. In combination with a vehicle frame and axle, a pair of levers each fulcrumed on the axle in a substantially vertical plane and extending in opposite directions from their fulcrums, means connecting said levers to the frame at points remote from their fulcrums and cushion springs engaging the levers intermediate such connections and said fulcrums, together with a cap for seating the upper end of each spring pivoted to one of the levers, and seating means for the lower ends of the springs comprising a saddle member fixed to the axle; together with a rod connected to the underside of each of said caps within the cushion spring, a stop on said rod and a lighter spring coiled about the rod reacting between the stop and the saddle member to oppose rebound of the cushion spring.

3. In the combination defined in claim 1, said lighter springs reacting against the cushion springs through the medium of rods pivotally connected to the respective levers, extending downwardly therefrom through said lighter springs and provided with stops for the lower ends of said springs.

4. In the combination defined in claim 1, the seating means for the cushion springs, comprising a saddle member fixed on the axle and engaging the lower ends of said springs, said lighter springs being stopped against the under side of said saddle, and rods connected to the levers, extending through the saddle and providing stops for the lower ends of the lighter springs.

5. In combination with a vehicle frame and axle, a pair of levers, each fulcrumed on the axle in a substantially vertical plane, and extending in opposite directions from their fulcrums, means connecting said levers to the frame at points remote from their fulcrums, cushion springs engaging the levers intermediate such connections and said fulcrums, a saddle member fixed on the axle providing seats for the cushion springs, one at each side of the axle, caps for said springs respectively pivoted to the levers opposite said seats, a rod connected to each lever and extending through the cushion spring and through the saddle, sleeves secured in openings in the seats of the saddle, and extending upwardly within the coils of the cushion springs, each of said sleeves having a stop flange at its upper end with an opening, admitting one of said rods, a lighter spring coiled about the rod within the sleeve to react against the stop flange at the upper end of the sleeve, and a stop on the rod for the lower end of said spring.

6. In combination with a vehicle frame and axle, a pair of levers, each fulcrumed on the axle in a substantially vertical plane, and extending in opposite directions from their fulcrums, means connecting said levers to the frame at points remote from their fulcrums, cushion springs engaging the levers intermediate such connections and said fulcrums, and seating means for said springs supported on the axle, together with a rod loosely connected to each of said levers and depending therefrom, a lighter spring coiled about each rod and stopped upwardly against the seating means, and a longitudinally adjustable stop on each rod for the lower end of the lighter spring.

7. In combination with a vehicle frame and axle, and means positively guiding the axle for movement toward and from the frame, a lever fulcrumed on the axle in a substantially vertical plane, means connecting said lever to the frame at a point remote from its fulcrum, a cushion spring engaging the lever intermediate such connection and said fulcrum, seating means for the spring supported on the axle and a lighter spring reacting between said cushion spring and a support on the axle to oppose rebound of the cushion spring.

In testimony whereof, I have hereunto set my hand at Chicago, Illinois, this 24th day of June, 1922.

FRANK BUSHMAN.